Figure 1:
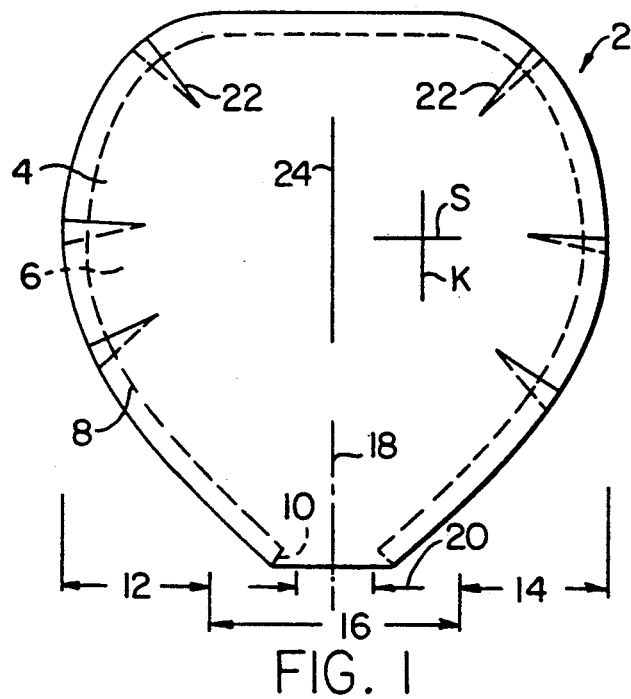

United States Patent [19]

Pillet

[11] Patent Number: 5,312,132
[45] Date of Patent: May 17, 1994

[54] GAS CUSHION AND METHOD AND APPARATUS FOR ITS MANUFACTURE

[76] Inventor: Jean-Francois Pillet, En Loup, CH-1429 Giez, Switzerland

[21] Appl. No.: 768,520
[22] PCT Filed: Jan. 10, 1991
[86] PCT No.: PCT/CH91/00008
  § 371 Date: Nov. 5, 1991
  § 102(e) Date: Nov. 5, 1991
[87] PCT Pub. No.: WO91/11345
  PCT Pub. Date: Aug. 8, 1991

[30] Foreign Application Priority Data

Jan. 26, 1990 [CH] Switzerland ............ 263/90

[51] Int. Cl.$^5$ .............................. B60R 21/20
[52] U.S. Cl. .................... 280/743 R; 139/291 C; 139/291 R; 139/1 R; 428/34.9; 428/35.7; 428/66
[58] Field of Search ............ 280/728, 743, 728 R, 280/, 729, 743 R; 139/291 C, 291 R, 1 R; 428/34.9, 35.7, 66

[56] References Cited

U.S. PATENT DOCUMENTS

| | | | |
|---|---|---|---|
| 4,825,912 | 5/1989 | Fleury et al. | 139/305 |
| 4,844,957 | 7/1989 | Hoffman | 428/34.9 |
| 4,894,265 | 1/1990 | Chang et al. | 428/34.9 |
| 4,921,735 | 5/1990 | Bloch | 280/743 |
| 5,052,447 | 10/1991 | Speich | 139/291 R |

FOREIGN PATENT DOCUMENTS

| | | | |
|---|---|---|---|
| 52-5126 | 1/1977 | Japan | 280/728 |
| 0254446 | 10/1989 | Japan | 280/728 |
| 0066347 | 3/1992 | Japan | 280/728 |

OTHER PUBLICATIONS

"System Breitenbach-Finishing Machine HA84-40-0-60" Brochure.

Primary Examiner—Margaret A. Focarino
Assistant Examiner—Paul Dickson

[57] ABSTRACT

An inflatable air cushion for use as a safety device in an automobile is made of two blanks cut from strips of fabric interwoven with one another along a seam extending along the peripheries of the blanks. The strips are initially flat, but include at least two side regions spaced from and on opposite sides of the central axis of the resulting cushion and running parallel to either the weft or warp threads of the fabric. These side regions are shrinkable under the influence of heat to a greater degree than a region lying between them to give each blank a convex shape and giving the cushion a more desirable rounded shape when inflated than if made with flat blanks. The ability to form the blanks into convex shapes by heat shrinking avoids the need for employing other more complicated and time consuming shaping procedures.

23 Claims, 4 Drawing Sheets

GAS CUSHION AND METHOD AND APPARATUS FOR ITS MANUFACTURE

The invention comprises a gas cushion, in particular for the safety system of vehicles, as well as a method for its manufacture and an apparatus for accomplishing the method.

From the German Patent DE-OS 21 21 793 a gas cushion is already known as well as a method and device for its manufacture. The gas cushion so manufactured is relatively flat and insofar as a safety system of a vehicle is concerned it is not adequate.

On the other hand it is known to manufacture gas cushions for safety systems of vehicles, so-called air bags, which however result in relatively complicated blanks and stitching work in order to achieve the convex shape necessary for such air bags.

It is an object of the present invention to form a gas cushion that can be manufactured in a simple manner without complicated blanks and stitching and to specify as well a corresponding method and a device for its manufacture.

The object according to the present invention is achieved:

(a) through a gas cushion having two overlying fabric blanks which are joined with one another along their periphery by a stitch seam;

(b) the method for manufacture of the gas cushion in which two fabric strips are positioned in overlying relationship and are joined together along a predetermined stitch seam to form a cushion-shaped section by shrinking the fabric strips in selected regions; and (c) an apparatus for manufacturing the gas cushion from two fabric strips with shrinking of the strips in selected regions.

Advantageous embodiments of the gas cushion are described in further detail below.

Therefore, in a gas cushion whose fabric blanks are joined together along its periphery through a mutual interweaving of seams with one another and having shrunken side regions which lie at least in the warp thread direction, a convex, voluminous form is obtained without the required additional stitch work. Although the shrinkage in the warp thread direction is preferred, it is also possible to have shrinkage exclusively or additionally in the weft direction. The weaving together of the fabric strips and the shrinkage of the side regions can be produced in a continuous process whereby not only a convex gas cushion is produced that is suitable as an air bag for a safety system of a vehicle, but also a gas cushion that is manufactured simply, fast and economically in few work steps with almost no additional processing. The gas cushion can consist of a shape that is rectangular or circular in form, or any other desired shape.

It is particularly appropriate if the gas cushion is configured such that the transition from the side regions to the center region is continuous. Another embodiment is also appropriate whereby in the middle region of the gas cushion an indentation is produced which is especially desirable even for air bags in order to give a person to be saved in a vehicle improved lateral support in case of need. One such profiling of a gas cushion constitutes an improvement by utilizing a reinforcing thread to impart shape to the cushion. In another embodiment the addition of pleats makes possible a further profiling of the gas cushion if the shrunken side regions should not be adequate for this purpose.

In another embodiment of the gas cushion, the shrinkage in stages at the interwoven seams, particularly if they are loosely woven there, yields on the one hand a great firmness and on the other hand high density of the seam.

In still a further embodiment the upper, more dense fabric blank holds a person to be secured more safely in case of need; however the looser weaving of the lower fabric blank permits a certain release of the gases so that particularly with a sudden inflation of the gas cushion the accompanying impact is halted and the holding effect of the gas cushion is reduced gradually through escape of gases through the lower fabric blank. This is desirable since the maximum holding force of the gas cushion in a safety system of a vehicle is only necessary for the moment of the accident of the vehicle following which, however, the holding force should again be reduced in order to be able to set free the protected person or to set him free.

In still a further embodiment not only the cutting of a gas cushion from a fabric strip is facilitated but also at the same time the threads of the fabric of the gas cushion are secured against unravelling.

The method and the apparatus for manufacturing the gas cushion are not particularly simple, however, as already stated above, they permit a very simple and inexpensive manufacturing of the gas cushion. It is only necessary to design the type of strip or select the material of the threads such that the sections of the side seams of the interwoven fabric strips can be shrunken. The shrinking itself can then be produced in a simple matter through a heating effect whereby the cushion-shaped section is cut out of the material band along its woven seam.

In one form, the method for manufacturing the gas cushion permits the gas cushion to be further profiled.

In one embodiment, the method for manufacturing the gas cushion utilizes fabric strips made from threads of a thermoplastic synthetic material. Such strips not only make shrinkage more favorable but also permit a later cutting out of the cushion-shaped section by fusion cutting. Moreover by this means the seam is secured. The shrinkage properties of the fabric strip permit the method to be varied such that loosely woven sections are shrunk more than the thickly woven sections.

The shrinkage of the cloth strips is accomplished most simply through a profiled, heated roller since the roller simultaneously contributes to control of the shrinkage. Also, however, infrared and hot air heating make possible in particular an additional shrinkage of the fabric strip in which the shrinkage in the weft direction is also possible.

Advantageous gas cushions are obtained through control of the material such that the upper fabric strip is especially dense and the lower cloth web is given a certain gas permeability.

One embodiment of the method introduces reinforcing threads which make possible a further profiling and stabilization of the gas cushion.

The apparatus suitable for accomplishing the manufacturing method for the gas cushion comprises a web machine as well as a succeeding device for areawise shrinkage of the cloth strip.

One embodiment of the apparatus is especially advantageous in that a profiled, heated roller controls the shrinkage process especially well. This shrinkage however can also be achieved using infrared or hot air heat alone or in combination with a profiled, heated roller.

The manufactured material strip can be developed practically according to one embodiment of the apparatus having a material rack for winding up the material or the material for example can be directly separated from a strip by means of cutting along a stitch seam of an individual gas cushion.

Figure 2:
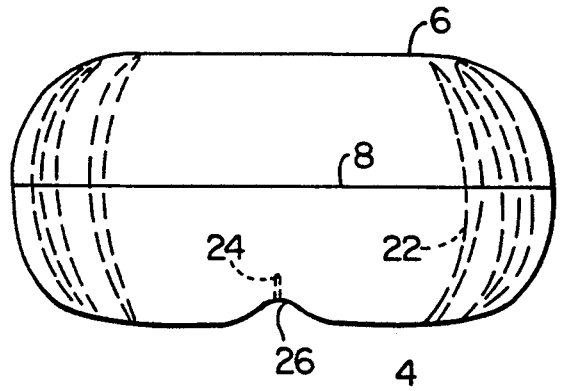
Figure 3:
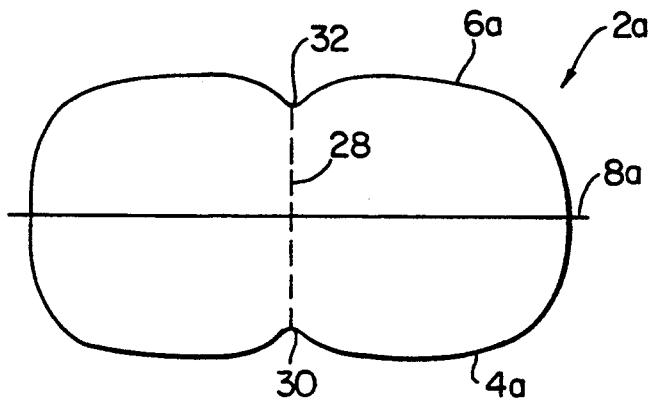
Figure 4:
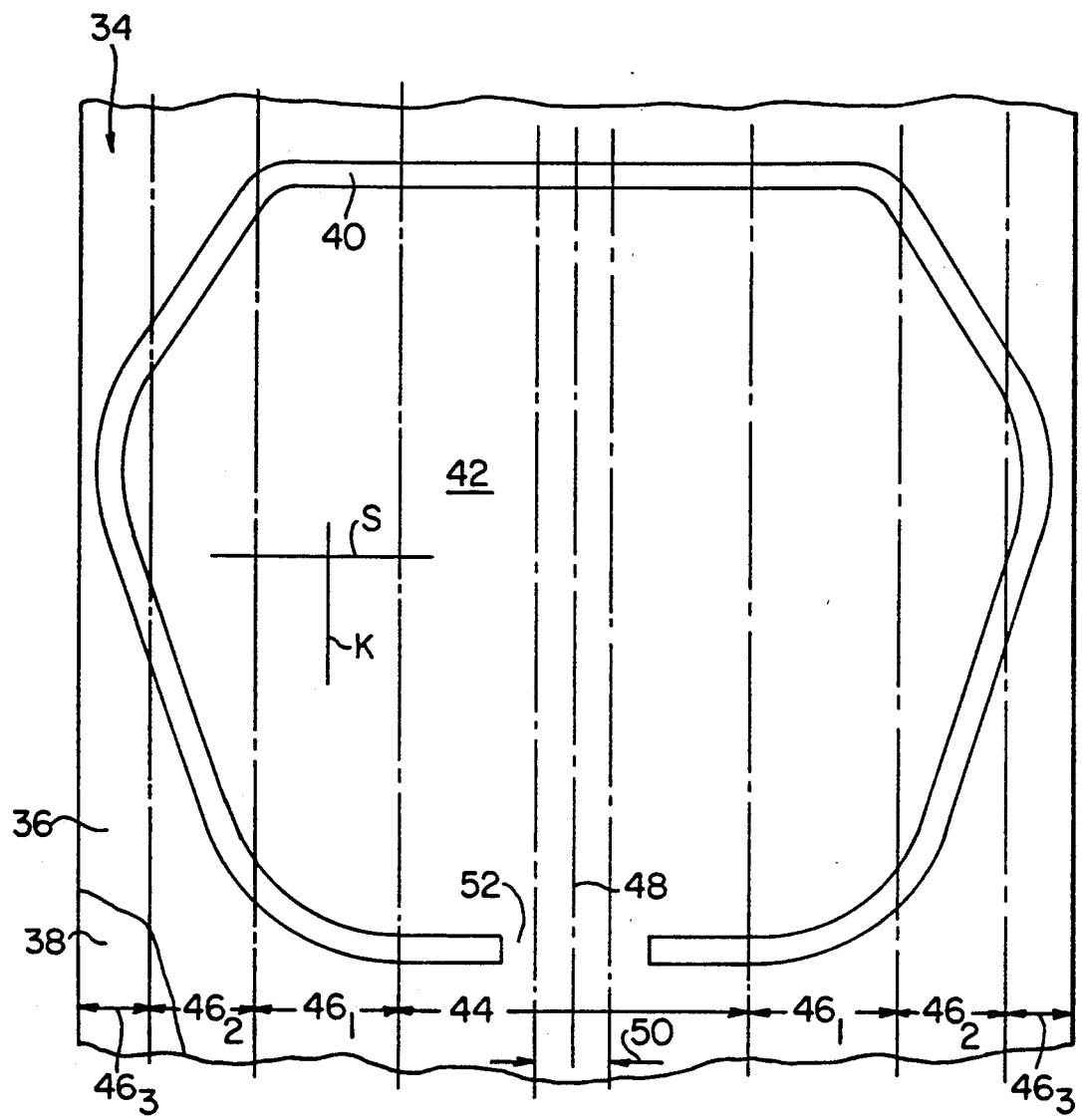
Figure 5:
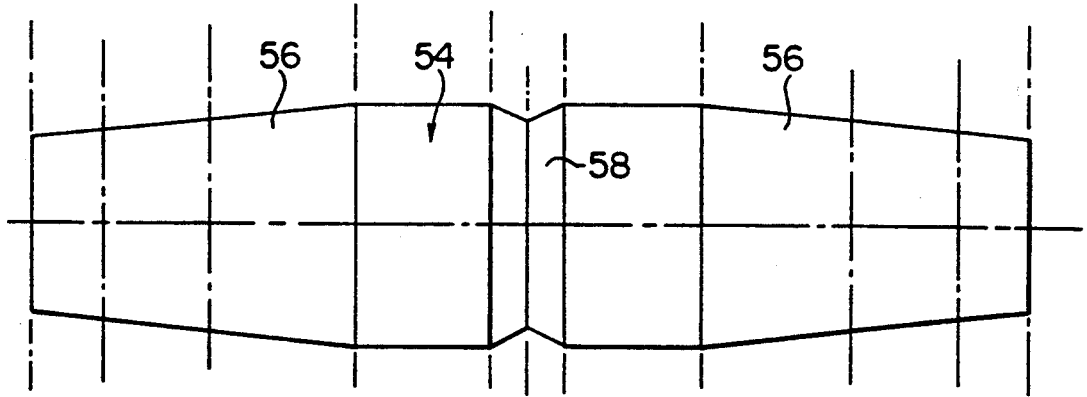
Figure 6:
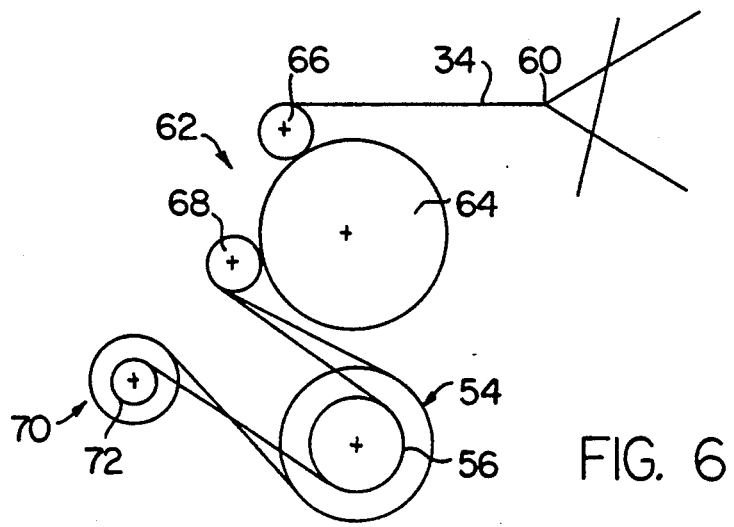
Figure 7:
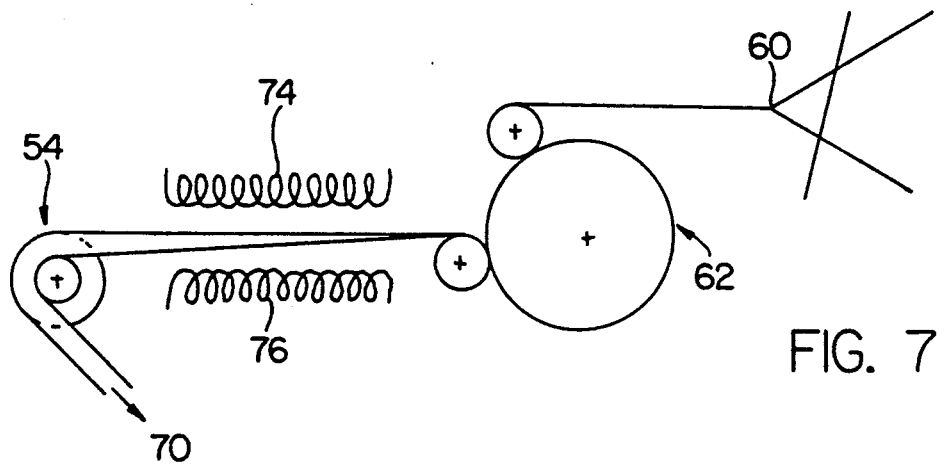
Figure 8:
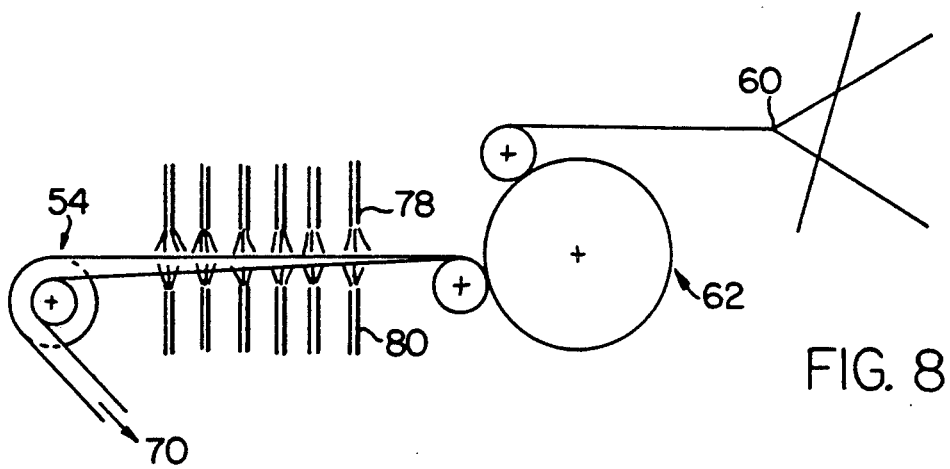

Exemplary embodiments of the object of the invention are further described below with the aid of drawings which accordingly illustrate:

FIG. 1 a gas cushion serving as an air bag for a safety system of a vehicle as viewed from the front;

FIG. 2 the gas cushion of FIG. 1 in a top plan view;

FIG. 3 a further gas cushion in a view from the front;

FIG. 4 a material strip manufactured in a textile machine with a cushion-shaped cutout;

FIG. 5 a heated roller for shrinking the material strip in FIG. 4;

FIG. 6 an apparatus with a heated roller for manufacture of the material strip with a gas cushion cutout in schematic illustration;

FIG. 7 a further apparatus with an infrared station in schematic illustration;

FIG. 8. a further apparatus with hot air jets in schematic illustration.

Figure 9:
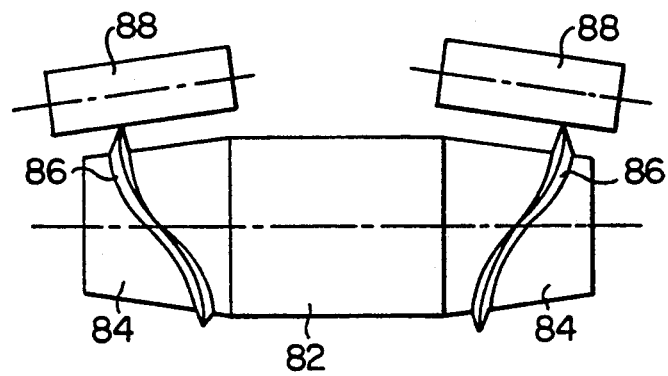

FIG. 9. a first device for fusion cutting as viewed longitudinally; and

Figure 10:
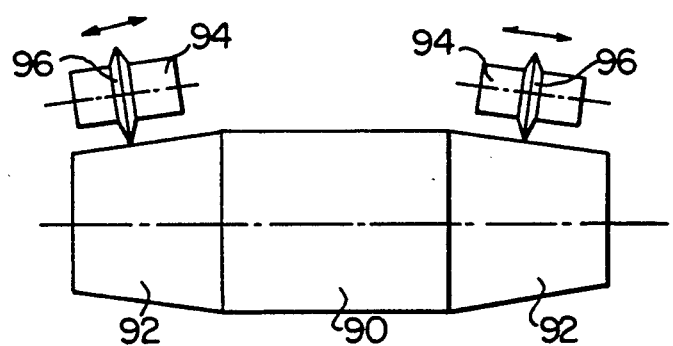

FIG. 10. a second device for fusion cutting as viewed longitudinally.

FIGS. 1 and 2 show a gas cushion that can be inserted into a safety system of a vehicle. The gas cushion consists of an upper fabric blank 4 and a lower fabric blank 6 which are connected with one another through interweaving along an inwardly lying seam 8. At the bottom end the seam is interrupted to form an opening 10. The opening 10 serves for inserting an air conduit that is not further illustrated. The gas cushion has side regions 12 and 14 oriented in the longitudinal direction of the warp threads K in which regions the fabric is shrunk. The shrinking decreases towards the center region 16. In the center region a further shrunken region 20 is provided at least in the upper fabric blank parallel to the center axis 18. The shrunken side regions 12, 14 impart to the gas cushion a convex form. This formation can be additionally facilitated by means of pleats 22. The shrunken region 20 provided along the center axis 18 which likewise can be reinforced by means of pleats 24 imparts to the gas cushion an indentation which serves the purpose, in the event of need, for holding a person to be protected in the center region of the gas cushion, that is, it prevents lateral slipping.

The gas cushion or correspondingly the fabric blanks are manufactured from thread made of a thermoplastic material which makes the shrinkage in predetermined areas possible and the thermal fusion cutting at the stitch seams. At the stitch seam 8 a 1:1 weave is preferably provided. The regions 12, 14 and 20 which are to be shrunk have a looser weave which can vary from the outer edge from a 4:4 weave near the stitch seam to a 1:1 weave in the center region. In order to realize the required 1:1 weave in each fabric blank, a weaving pattern $\frac{1}{3}/3/1$ is necessary, that is, with $\frac{1}{3}$, there are $\frac{2}{3}$ of the shafts and with that the warp threads are produced below and the weft threads above in each cloth. With 3/1 there are $\frac{2}{3}$ of the shafts, and with that warp threads are produced above and the weft threads below. It is also possible to provide the upper fabric blank with higher density and the lower fabric blank with more looseness. The latter will for example achieve a situation in which the lower fabric blank has a thinner weft thread than the upper fabric blank exclusively or only in alternating rows and/or each n-th weft thread is omitted. In this manner the upper, that is front fabric blank, is thicker than the lower, that is the rear fabric blank, whereby with a sudden inflation of the gas cushion the impact on a person is softened and a gas or particle penetration is prevented. Since the gas cushion in safety systems should only be effective during the impact of a vehicle and then its effectivity can attenuate, the looser weave in the lower fabric blank is of advantage since it makes possible the gradual discharge of air from the gas cushion and with it relief of the person saved by the gas cushion.

FIG. 3 shows a further gas cushion $2a$ that corresponds to each of the FIGS. 1 and 2 so that reference should be made to the embodiments above. With the gas cushion $2a$ however the seam $8a$ is on the outside so that the gas cushion can be manufactured as further detailed below. The upper fabric blank $4a$ contains an interwoven stronger reinforcing thread 28 which is loosely and periodically connected with the lower cloth blank $6a$ and to be sure in such a manner that in the inflated condition the constrictions 30, 32 are formed at both sides of the gas cushion $2a$ in the fabric blanks $4a$, $6a$, which correspond to the indentations 26 of the gas cushion 2 in FIGS. 1 and 2. Such additional stronger reinforcing threads 28 also improve the stability of the gas cushion $2a$.

FIGS. 4 and 5 reveal the method for manufacturing the gas cushions 2 and $2a$. In particular FIG. 4 shows a material strip 34 which comes from the web station of a web machine illustrated in FIG. 6 and from which the upper fabric strip 36 and the lower fabric strip 38 are formed. The fabric strips 36, 38 are each formed from warp threads K and weft threads S in a known fashion. At the stitch seam 40 the upper fabric strip 36 and the lower fabric 38 are tacked together or interwoven so that a cushion-shaped section 42 is formed in the material strip 34. The assembling of the threaded materials and/or the weaving of the material strips is so selected that a distinct shrinkage behavior results along the material strip, particularly transverse to the longitudinal direction. The center region 44 connects with the two side regions $46_1$, $46_2$, $46_3$ with increasing shrinkage characteristics whereby the shrinkage characteristics at the outermost areas $46_3$ are greatest. Along of the center axis 48 the material strip is again provided with a narrow region 50 having increased shrinkage characteristics. There, where the fabric strip should not be shrunk, that is, in the center region 44, a 1:1 weaving of the fabric is appropriately provided. The side regions $46_1$, $46_2$, $46_3$ and the region 50 at the center axis 48 have on the other hand a weave that, for example, can extend from the 2:2 weave at the junction with the center region 44 to a 4:4 weave or more at the outer region. The stitch seam is moreover provided with a space 52 at which the fabric strips 36, 38 are not connected with one another and this serves for affixing a valve or a gas conduit. The material strip 34 manufactured in this manner after being drawn off the web machine is guided over a heated roller 54 which has reduced cross-section which preferably are formed through conical sections 56, 58 at the regions to be shrunk. By guiding the material strip over the heated roller 54 the strip is shrunk at the corresponding regions $46_1$, $46_2$, $46_3$ as well as 50.

The shrunken material strip can then be further processed immediately or can be rolled up on a material rack illustrated in FIG. 6. The material rack is preferably provided likewise with sections of reduced cross-section similar to the heated roller 54.

The cushion-shaped sections 42 are then cut out of the material strip so manufactured along the stitch seam 40 by means of thermal fusion cutting, if necessary with still additional stitching provided at the shrunken regions. The cushion-shaped sections 42 can then be formed directly into the cushion 2a according to FIG. 3 or after being turned inside out, the cushion 2 according to FIGS. 1 and 2.

FIG. 6 shows in a schematic illustration a lateral view of an apparatus with a conventional web machine for manufacture of the gas cushions. The material strip shown in FIG. 3 is woven at the web station 60. In order to achieve the densest fabric possible, the web station 60 is associated with a clamping bar holder or a material holddown according to Patent Application W089/08734 equivalent to U.S. Pat. No. 5,052,447 which is not illustrated. The latter can be heated in the middle region in order to preprocess the material strip at that region, that is the middle region, which should not be shrunk upon itself, in order to eliminate residual tension. The material strip is guided by means of discharge device 62, consisting of the discharge roller 64 with an infeed holddown roller 66 and with a outfeed take-off roller 68, over the heated roller 54 which consists of the conical sections 56, 58. Thereafter the shrunken material strip is wound up on the material rack 70 which likewise is provided with conical sections 72 corresponding to the heated roller 54.

FIGS. 7 and 8 show two further variations of such an apparatus whereby the heated roller 54 is supplemented by means of an infrared beaming device 74, 76 according to FIG. 7 and hot air jets 78, 80 according to FIG. 8.

FIGS. 9 and 10 show a device for fusion cutting of the material strip to be manufactured, for example, according to FIGS. 4 to 8. The fusion cutting is produced directly after the shrinkage in series with the manufacture of the material strip or after intervening storage. The apparatus of FIG. 9 consists of a roller 82 with conical sections 84 associated with the shrinkage regions of the material strip. The shaft is provided with a cutting blade 86 shaped in a manner corresponding to the pattern to be cut from the material strip. The material strip is pressed by means of heated pressure rollers 88 against the blade 86. The apparatus according to FIG. 10 includes a roller 90 with lateral, conical sections 92 on which the material strip rests. The heated rollers 94 with continuous cutting blades 96 serve as cutting elements which are pressed against the roller 90 and are shifted laterally by means of electronic controls according to the pattern to be cut.

Still further embodiments are possible. In particular it is possible to shrink the web exclusively or additionally in the weft direction. Here the weft threads must on the one hand and the web conditions on the other hand, in particular the density of the warp threads, be so adjusted that a shrinkage is possible in the weft direction. Besides the gas cushion can also be produced transverse to the longitudinal direction of the material strip, that is transverse to the warp direction. The shrinkage is then produced over a level cylindrical heated roller.

In the claims which follow, when it is said that a fabric blank or strip is shrunk in one region to a lesser degree than in some other region or regions, such lesser degree of shrinking is intended to include the possibility of the blank or strip not being shrunk at all in said one region while being shrunk to some degree in said other region or regions.

I claim:

1. A gas cushion, in particular for the safety system of a vehicle, having two overlying fabric blanks woven out of a set of weft threads and a set of warp threads, said blanks having a center axis and being joined with one another at their peripheries by means of mutual interweaving at a seam, said blanks each having at least two side regions located on opposite sides of and spaced from said center axis and each having at least one center region located between its two side regions, said side regions extending parallel to the threads of one of said sets of threads, characterized in that each of said fabric blanks is shrunk in its said side regions to a greater degree than in its said center region.

2. A gas cushion according to claim 1 characterized in that said center region of each of said blanks runs parallel to its said side regions, and that the shrinkage in said side regions decreases in moving towards said center region.

3. A gas cushion according to claim 1 characterized in that at least one of said fabric blanks has a narrow region lying along said center axis and spaced from its side regions and which narrow region of said at least one blank is shrunk to a greater degree than is its said center region.

4. A gas cushion according to claim 1 characterized in that said gas cushion has a middle region running parallel to and spaced from said side regions of said blanks, and that said gas cushion has reinforcing threads interwoven with said fabric blanks at said middle region of said cushion and which threads are periodically connected loosely between said blanks.

5. A gas cushion according to claim 1 characterized in that at least one pleat is located in at least one of said side regions of at least one of said blanks.

6. A gas cushion according to claim 1 characterized in that said seam is shrunk at least in the portions thereof located in said side regions of said blanks.

7. A gas cushion according to claim 1 characterized in that said two fabric blanks consist of an upper fabric blank and a lower fabric blank, and that said upper fabric blank has a more dense weave than said lower fabric blank due to said upper fabric blank being made with weft threads which are individually thinner than the weft threads of said lower fabric blank.

8. A gas cushion according to claim 1 characterized in that said fabric blanks are ones formed by means of thermal fusion cutting of said blanks from a strip of material made of two overlying strips of interwoven fabric.

9. A gas cushion according to claim 1 characterized in that said two fabric blanks consist of an upper fabric blank and a lower fabric blank, and that said upper fabric blank has a more dense weave than said lower fabric blank due to said lower fabric blank being made with weft threads which are fewer in number than the weft threads of said upper fabric blank.

10. A method for manufacturing a gas cushion in which a material strip made from two fabric strips of equal width, directly overlying one another and composed of weft threads (S) and warp threads (K), is formed in a process in which said warp and weft threads of said two fabric strips are interwoven with one another at a predetermined seam to form a cushion shaped section, characterized in that the side regions of said material strip which extend into said cushion shaped section are first so made that said side regions will shrink under a warming effect, said interwoven fabric strips are then shrunk in said side regions by means of a warming effect, and finally, said cushion shaped section is cut from said material strip along said interwoven seam.

11. A method according to claim 10 characterized in that at least one of said two fabric strip is made so as to additionally include a narrow region running parallel to and spaced from said side regions and shrinkable under a warming effect, and in that said narrow region is also shrunk by a warming effect.

12. A method according to claim 10 characterized in that said fabric strips are manufactured from a thermoplastic material.

13. A method according to claim 10 characterized in that said fabric strips are woven in said side regions with a looser weave than in the rest of said strips.

14. A method according to claim 10 characterized in that said fabric strips are shrunk in said side regions by passing them over at least one heated roller having a reduced cross-section along the length thereof engageable with said side regions of said material strip.

15. A method according to claim 10 characterized in that said fabric strips are shrunk in said side regions by means of indirect heating.

16. A method according to claim 10 characterized in that said fabric strips consist of an upper fabric strip and a lower fabric strip, and that said upper fabric strip is manufactured to be more dense than said lower fabric strip by using in said upper fabric strip weft threads which are individually thinner than the weft threads of said lower fabric strip.

17. A method according to claim 10 characterized in that said material strip has a middle region extending parallel to and spaced from said side regions, and at least one reinforcing thread is interwoven with one of said fabric strips and is periodically connected loosely with the other of said fabric strips.

18. A method according to claim 10 characterized in that said fabric strips consist of an upper fabric strip and a lower fabric strip, and that said upper fabric strip is manufactured to be more dense than said lower fabric strip by using in said lower fabric strip weft threads which are fewer in number than the weft threads of said upper fabric strip.

19. An apparatus for manufacturing a gas cushion comprising: a weaving machine for the continuous manufacture of a material strip made up of two fabric strips overlying one another and for interweaving said fabric strips along a predetermined seam, each of said strips having a center axis extending along the length of the strip, two side regions located on opposite sides of and spaced from said center axis and a center region located between said two side regions, said side regions and said center region extending continuously along the length of the strip, said weaving machine having a discharge station from which said material strip made by said machine emerges, and a shrinking device associated with said discharge station of said weaving machine for continuously receiving said material strip as it is discharged from said discharge station and for continuously shrinking each of said fabric strips of said material strip such that each of said fabric strips is shrunk to a greater degree in its said side regions than it is in its said center region, said shrinking device including a heated roller over which said material strip passes, said roller having two side sections over which said side regions of said fabric strips pass and at least one center section over which said center regions of said fabric strips pass, said side sections of said heated roller having cross-sections of reduced diameter in comparison to the diameter of the cross-section of said center section.

20. An apparatus according to claim 19 characterized in that said device for shrinking the fabric strips also includes an infrared beaming device for heating said side regions of said fabric strips.

21. An apparatus according to claim 19 characterized in that said device for shrinking said fabric strips also includes hot air jets for heating said side regions of said fabric strips to be shrunk.

22. An apparatus according to claim 19 characterized in that said apparatus has a material rack for winding up said material strip, said rack having side sections of reduced cross-section associated with said side regions of said fabric strips.

23. An apparatus according to claim 19 characterized in that said apparatus has a thermal cutting device following said device for shrinking said fabric strips, said thermal cutting device having a cutting roller corresponding in shape to said heated roller so as to have two side sections over which said side regions of said fabric strips pass and at least one center section over which said center region of said fabric strips pass, said side sections of said cutting roller having cross-sections of reduced diameter in comparison to the diameter of the cross-section of said center section of said cutting roller, and heated cutting blades associated with said cutting roller.

* * * * *